(12) United States Patent
van Nee et al.

(10) Patent No.: US 8,948,198 B2
(45) Date of Patent: Feb. 3, 2015

(54) ADVANCED WIRELESS PACKET TRANSMISSION SCHEME WITH ENHANCEMENTS TO ACCOMMODATE BASIC WIRELESS PACKET TRANSMISSION SCHEME

(75) Inventors: D. J. Richard van Nee, De Meern (NL); Vincent K. Jones, Redwood City, CA (US)

(73) Assignee: QUALCOMM Incorporated, San Jose, CA (US)

( * ) Notice: Subject to any disclaimer, the term of this patent is extended or adjusted under 35 U.S.C. 154(b) by 1237 days.

(21) Appl. No.: 11/681,531

(22) Filed: Mar. 2, 2007

(65) Prior Publication Data
US 2007/0207823 A1 Sep. 6, 2007

Related U.S. Application Data

(60) Provisional application No. 60/780,041, filed on Mar. 2, 2006.

(51) Int. Cl.
*H04J 3/16* (2006.01)
*H04W 4/00* (2009.01)
(Continued)

(52) U.S. Cl.
CPC .......... *H04W 16/12* (2013.01); *H04W 72/0406* (2013.01); *H04W 72/06* (2013.01); *H04W 72/085* (2013.01); *H04W 84/18* (2013.01); *H04W 88/02* (2013.01); *H04W 92/02* (2013.01)
USPC ............ 370/465; 370/328; 370/338; 370/329

(58) Field of Classification Search
CPC ..... H04W 28/20; H04W 28/26; H04W 72/06; H04W 74/02; H04W 88/06; H04K 2203/18; H04K 3/226; H04L 1/0003; H04L 1/0006; H04L 27/261; H04L 27/2613; H04L 5/0048
USPC ........... 370/310, 310.1, 310.2, 328–335, 338, 370/339, 341, 342, 348, 350, 464, 465
See application file for complete search history.

(56) References Cited

U.S. PATENT DOCUMENTS

| 6,061,339 | A | 5/2000 | Nieczyporowicz et al. | |
|---|---|---|---|---|
| 6,236,656 | B1 | 5/2001 | Westerberg et al. | |
| 2005/0136933 | A1* | 6/2005 | Sandhu et al. | 455/450 |

(Continued)

OTHER PUBLICATIONS

International Search Report dated Jul. 28, 2008 for PCT Application Serial No. PCT/US07/63204, 8 Pages.
Written Opinion—PCT/US2007/063204—ISA/EPO—Jul. 28, 2008.

*Primary Examiner* — Matthew Sams
(74) *Attorney, Agent, or Firm* — Howard Seo

(57) ABSTRACT

Methods and systems for signaling on a mixed-mode wireless network comprising a plurality of channels are provided. The mixed-mode wireless network includes high-throughput (HT) wireless devices and legacy wireless devices that use channels of the same width. The HT devices transmit data on at least two channels, while the legacy devices transmit on one channel. The distances between the HT channels and the distances between the legacy channels might differ, however, the channels used by the HT devices and the legacy devices may overlap. As a result, cooperation between the HT devices and legacy devices is provided to enable the devices to coexist on the same wireless network by minimizing collisions and interference. The HT devices are configured to send control information to the legacy devices to coordinate transmission by the HT devices with the legacy devices.

23 Claims, 10 Drawing Sheets

(51) Int. Cl.
*H04W 16/12* (2009.01)
*H04W 72/04* (2009.01)
*H04W 72/06* (2009.01)
*H04W 72/08* (2009.01)
*H04W 84/18* (2009.01)
*H04W 88/02* (2009.01)
*H04W 92/02* (2009.01)

(56) References Cited

U.S. PATENT DOCUMENTS

| | | | |
|---|---|---|---|
| 2005/0152299 A1* | 7/2005 | Stephens | 370/315 |
| 2005/0180361 A1* | 8/2005 | Hansen et al. | 370/334 |
| 2005/0181800 A1* | 8/2005 | Trachewsky et al. | 455/452.1 |
| 2006/0146869 A1* | 7/2006 | Zhang et al. | 370/465 |
| 2006/0165114 A1* | 7/2006 | Diepstraten et al. | 370/445 |

* cited by examiner

US 8,948,198 B2

ADVANCED WIRELESS PACKET TRANSMISSION SCHEME WITH ENHANCEMENTS TO ACCOMMODATE BASIC WIRELESS PACKET TRANSMISSION SCHEME

CROSS-REFERENCES TO RELATED APPLICATIONS

This application claims the benefit of U.S. Provisional No. 60/780,041, filed on Mar. 2, 2006, the full disclosure of which is incorporated herein by reference.

FIELD OF THE INVENTION

The present invention relates to wireless networking in general and in particular to handling wireless networking wherein a network comprises devices of different generations and/or capabilities.

BACKGROUND OF THE INVENTION

Wireless networks have become quite popular, but higher throughput networks are constantly in demand. However, as newer and faster network devices become available, not all prior generations of devices disappear, so coexistence and interoperability of old and new devices must be addressed.

An example wireless network is one that operates according to one or more wireless protocol standards published by the IEEE ("Institute of Electrical and Electronics Engineers"), such as the IEEE 802.11 for Wireless LAN ("local area network") or WLAN standards that have been widely adopted for use in wireless networking devices. The IEEE 802.11 standard continues evolve as new amendments are ratified. Currently, the IEEE 802.11 standard comprises several modulation techniques that all use the same communication protocol, including the 802.11a, 802.11b, and 802.11g amendments to 802.11.

The 802.11a, 802.11b, and 802.11g standards are used extensively in wireless networking devices. Devices that use the 802.11 a standard operate in a 5 GHz (gigahertz) frequency band, and 802.11b and 802.11g devices operate in a 2.4 GHz frequency band. The 802.11 a standard provides for higher data rates than the 802.11b standard, but the 802.11 a standard provides a significantly shorter range than the range of 802.11b and 802.11g devices. Devices operating according to the 802.11a standard are not normally interoperable with 802.11 b/g devices. However, some devices are adapted to support both 802.11a and 802.11b/g. The 802.11b and 802.11g standards are interoperable, but in some older networks the presence of a 802.11b device may cause significant slowing of 802.11g compliant devices in order to accommodate the 802.11b compliant device.

The 802.11a/b/g WLAN standards may provide adequate performance for many wireless networking applications. However, as next generation high throughput (HT) devices providing higher performance are developed and become available, HT devices will need to coexist with legacy devices supporting older standards. For example, HT devices using IEEE 802.11n will need to be able to coexist and interoperate with legacy devices using the 802.11 a/b/g WLAN standards, since legacy devices using these standards are not likely to disappear from use immediately upon the introduction of next generation devices.

Coexistence is where differing devices can operate in a common space and still perform most or all of their functions. For example, a HT transmitter transmitting to an HT receiver might coexist with a legacy transmitter transmitting to a legacy receiver and the HT devices can communicate while the legacy devices communicate, or at least where the two domains are such that one defers to the other when the other is communicating. Coexistence is important so that the adoption and/or use of HT devices do not require the replacement or disabling of existing infrastructures of legacy devices.

Interoperability is where a HT device and a legacy device can communicate. For example, a HT device might initiate a transmission in such a manner that a legacy device can receive the data sent by the HT transmitter and/or indicate that it is a legacy device so that the HT transmitter can adjust its operations accordingly. For example, the HT transmitter might revert to standards compliant communications or switch to a mode that, while not fully standards compliant, is available to the legacy receiver. In another situation, a HT receiver might successfully receive data from a legacy transmitter.

BRIEF SUMMARY OF THE INVENTION

Systems and methods are provided for enabling next generation wireless devices to coexist and interoperate with legacy wireless devices. According to an embodiment, a method for signaling on a mixed-mode wireless network is provided. The mixed mode network includes high-throughput wireless devices and legacy wireless devices. The high-throughput wireless devices and the legacy wireless devices transmit on channels of the same width (e.g., 20 MHz), but the channel separation used by the high-throughput devices and the legacy devices may be different. Furthermore, the high-throughput wireless devices transmit on at least two channels simultaneously while the legacy devices transmit on only a single channel.

The method for signaling on the mixed-mode wireless network comprises the steps of: transmitting a legacy-part of a mixed-mode preamble on both high-throughput channels associated with a high-throughput device, transmitting a high-throughput part of a mixed-mode preamble on at least one of the high-throughput channels; and transmitting high-throughput data on both of the high-throughput channels after transmitting the high-throughput part of the mixed-mode preamble. In the step of transmitting a legacy part of the mixed-mode preamble, the frequency of at least one of the high-throughput channels is offset by a high-throughput channel separator. The offsets the frequency of at least one of the high-throughput channels, such that the high-throughput channel frequency coincides with the frequency of at least one of the legacy channels.

According to another embodiment, a high-throughput (HT) wireless receiver is provided. The HT receiver includes at least one antenna for receiving a high-throughput wireless signal. The HT receiver also includes a legacy signal processing module configured for detecting and processing signals from legacy devices received via the at least one antenna. The HT receive also includes an HT signal processing module configured for detecting and processing HT signals received from HT devices via the at least one antenna. A baseband processing module is also include for processing the HT device signals and legacy device signals received via the at least one antenna.

According to yet another embodiment, an HT wireless transmitter is provided. The HT wireless transmitter comprises at least one antenna configured for transmitting HT wireless signals. The HT signals are transmitted over two high-throughput channels. The HT wireless transmitter also includes an HT signal generation module configured to generate HT signals for transmission over both of the HT channels. The HT transmitter also includes a legacy signal generation module configured to generate legacy signals that can be processed and understood by legacy devices. The HT transmitter also includes a legacy signal duplication module configured to broadcast a duplicate legacy signal over both of the HT channels.

Other features and advantages of the invention will be apparent in view of the following detailed description and preferred embodiments.

DETAILED DESCRIPTION OF THE INVENTION

One skilled in the art will recognize that the teachings of the figures and this disclosure as depicted as examples of implementations of the present invention, and that many other implementations are possible without departing from the present invention.

Figure 1:
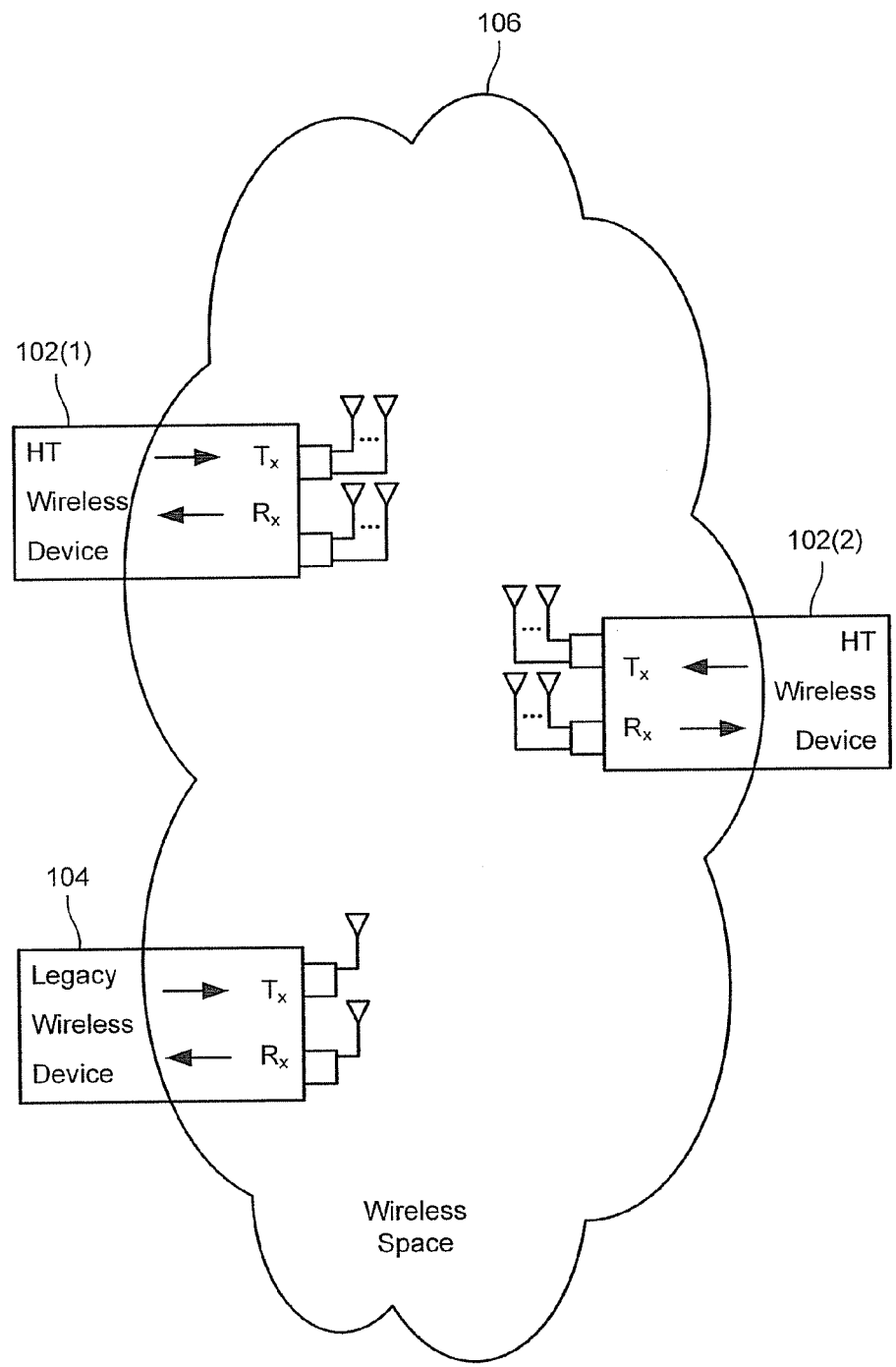
FIG. 1 illustrates several devices coupled via a wireless network.

Embodiments of present invention provide a system and method for high-throughput (HT) operation that is configured such that the HT devices can coexist and/or interoperate with legacy devices. This mode of operation is referred to herein as "mixed mode" operation. FIG. 1 illustrates just one example of a wireless network being used for mixed mode communications among transmitters and receivers, where the wireless network includes both HT wireless devices 102(1) and 102(2) and legacy wireless devices 104. HT wireless devices 102(1) and 102(2) are configured for high throughput communications, and might, for example, use 802.11n communications. Legacy wireless device 104 is configured to use legacy communications standards. For example, legacy wireless device may be configured to use 802.11 a/b/g communications. HT devices 102(1) and 102(2) are configured to coexist with legacy device 104. Legacy device 104 continues to use legacy protocols for communications and HT devices 102(1) and 102(2) use HT protocols for communication.

HT devices 102(1) and 102(2) might operate using multiple channels and/or multiple transmit antennas and/or multiple receive antennas. Devices might have a single transmit antenna and a single receive antenna, or more than one transmit antenna and/or more than one receive antenna. While separate transmit and receive antennas are shown, antennas might be used for both transmitting and receiving in some devices.

Border 106 is not a physical border, but is shown to represent a space within which signals can be received from devices within the space. Thus, as one device transmits a signal representing a packet within border 106, other devices within border 106 pick up the signals and, as they are programmed, will attempt to determine if the signals represent packets and if so, then demodulate/decode the packets to obtain the data represented therein.

One skilled in the art will recognize that various numbers of HT wireless devices and legacy wireless devices may be included in the wireless network, and that the configuration described herein only includes a few wireless devices in order to illustrate the various features of the system. Furthermore, in order to take advantage of the higher throughput of HT devices, at least an HT transmitter and an HT receiver would need to be included in the network.

According to some embodiments, a HT transmitter is configured to send twice as much data as legacy devices by using two 20 MHz channels for a total bandwidth of 40 MHz. Embodiments of the present invention may be advantageously used with these legacy devices to provide HT throughput using two 20 MHz channels (a control channel and an extension channel) while enabling the legacy devices to continue operating using a single 20 MHz channel. An advantage of this configuration is that legacy devices do not need to be reconfigured to operate with HT devices, because the HT devices adapt to coexist and/or interoperate with the legacy devices. In other embodiments, the HT transmitter can send more or less than twice as much data as the legacy system.

One skilled in the art will recognize that the embodiments described herein are merely exemplary and that embodiments of the invention might be used with HT and legacy devices operating on wireless networks with different frequency and channel characteristics. For example, the spacing between legacy channels may be greater than or less than 25 MHz, and the spacing between HT channels might be greater than or less than 20 MHz. Furthermore, the size of the channels used by the HT devices and the legacy devices may be greater than or less than the 20 MHz described in the various embodiments described herein. In yet other embodiments, the HT devices might also be configured to transmit on more than two channels which may require that multiple channel separator parameters be defined for determining a frequency offset used to align multiple HT channels to legacy channels such that legacy devices are able receive transmissions from the HT devices and vice versa.

Figure 7:
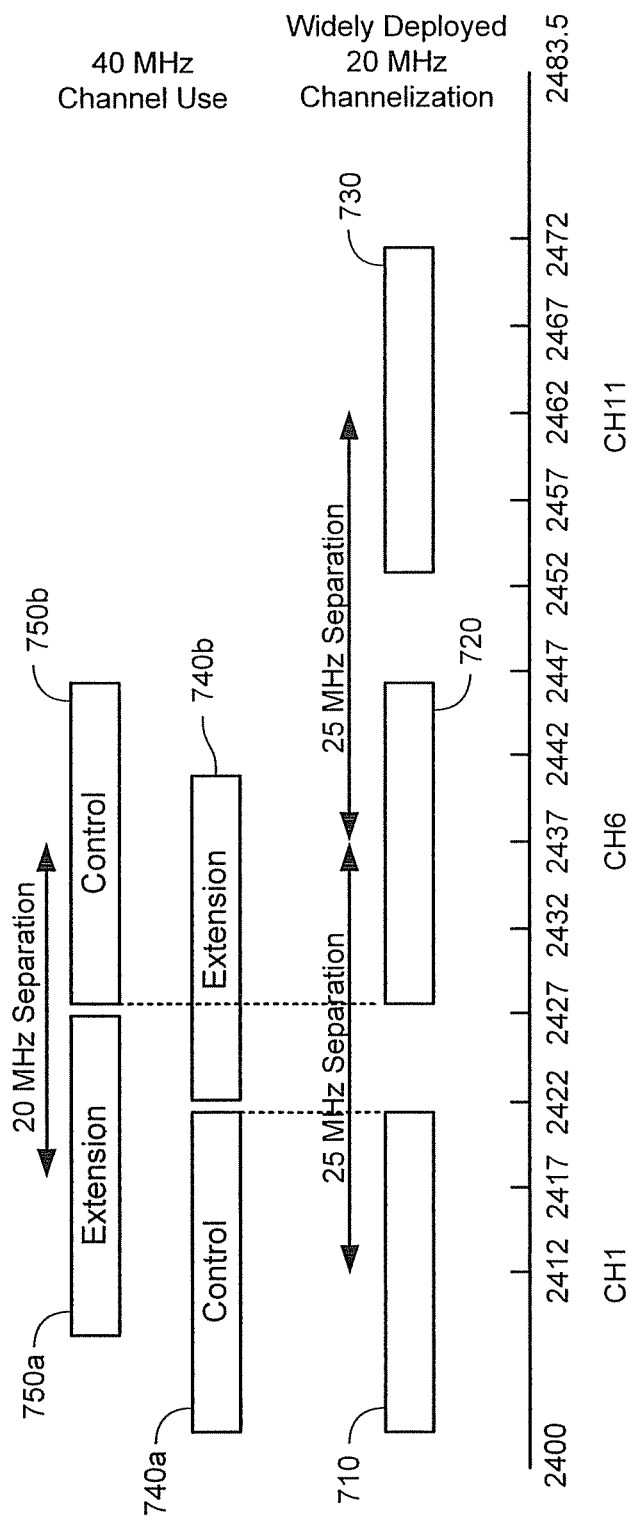
FIG. 7 is a diagram illustrating the channel utilization of HT and legacy devices according to an embodiment.

FIG. 7 provides an illustration of a channel mapping for a wireless network comprising legacy and HT devices operating at 2.4 GHz. The 2.4 GHz band contains 11 separate channels spaced 5 MHz apart (in the United States). Channels CH1 (2412 MHz) 710, CH6 (2437 MHz) 720, and CH11 (2642 MHz) 730 are most widely used non-overlapping channels in the 2.4 GHz band, because they provide the greatest separation between the channels since the center frequencies of these channels are 25 MHz apart.

The legacy system might implement 802.11g. Since the CCK/DSSS (complementary code keying/direct-sequence spread spectrum) waveforms used in 802.11g are 22 MHz wide, this configuration advantageously minimizes adjacent channel interference.

HT devices, according to some embodiments, can operate on two 20 MHz channels for HT operation that have center frequencies that are 20 MHz apart. One of the two channels is a control channel, e.g., 740a or 750a, and the other channel is an extension channel, e.g., 740b or 750b. The two 20 MHz channels are designed to have center frequencies that are 20

MHz apart. As a result, interoperability problems with devices using legacy channel configurations might result, due the offset of the channels created by the difference in channel spacing between the legacy devices and the HT systems. For example, if an HT device is using CH1 as its control channel 740a, then the center frequency of the device's extension channel 740b will be CH5. Thus, extension channel 740b will be offset from CH6 used by the legacy devices by 5 MHz. This offset can cause interoperability problems between the HT device using CH5 and legacy devices using CH6. Legacy transmissions on CH6 might be detected as interference by an HT receiver operating on CH5, and HT transmission on CH5 may be detected as interference by a legacy receiver operating on CH6.

As described above, an HT device may broadcast using two 20 MHz channels to create a 40 MHz potential throughput. Legacy devices may be operating one or both of these 20 MHz channels. Therefore, an HT device might take certain actions to ensure that an HT transmission will not interfere with legacy devices. One approach is that the HT device sends legacy control frames on both 20 MHz channels to alert legacy stations to defer transmitting while the HT device transmits on both of the 20 MHz channels. In another approach, the HT device transmits preamble information with the data transmitted on each of the 20 MHz channels comprising the 40 MHz transmission, and any legacy devices operating on the 20 MHz channels used by the HT device can decode the preamble information in order to recognize that the legacy device may ignore the HT content.

However, approaches such as legacy control frames and preamble information are not effective for preventing HT devices from interfering with the operation of legacy devices, and vice versa, where the legacy devices operate on channel center frequencies which are not aligned with one or both of the 20 MHz channels that comprise the 40 MHz channel used HT devices. Where there is an offset between adjacent channels used by legacy devices, the signals sent by an HT device may be interpreted as unintelligible interference by legacy devices operating on an adjacent channel.

As explained herein, one solution to this problem is to alter the separation between channels in the high throughput (HT) devices so that a legacy receiver can understand enough of the HT transmission so as to not cause ill effects. For example, the legacy receiver might be able to receive and process enough of a transmission to recognize that the legacy device should defer use of the channel for a specified period of time to allow an HT device to complete a transmission.

According to an embodiment (referred to herein as Option 1), an HT device uses a programmable frequency separation to enable the device to interoperate with legacy devices. The HT device includes a legacy duplicate mode where the HT device transmits a legacy-part of a mixed-mode preamble to the legacy devices by shifting one (or both) of its HT broadcast channels to align with legacy channels. The programmable frequency separation is used as a offset for shifting the frequency of an HT channel. For example, in an embodiment, the two HT channels may have a 20 MHz separation (such as that of HT channels in the IEEE 802.11n standard) and the legacy channels may have a 25 MHz separation (such as that in IEEE 802.11b/g). One of the HT channels would be aligned with one of the legacy channels. However, the second HT channel would not line up properly with the (as illustrated in FIG. 7). Accordingly, a programmable frequency separation of 5 MHz might be appropriate in this situation, because the second HT channel could be shifted by 5 MHZ so that HT channels and the legacy channels each have a separation of 5 MHz. It should be understood that other shifts might be used and/or present.

Figure 8:
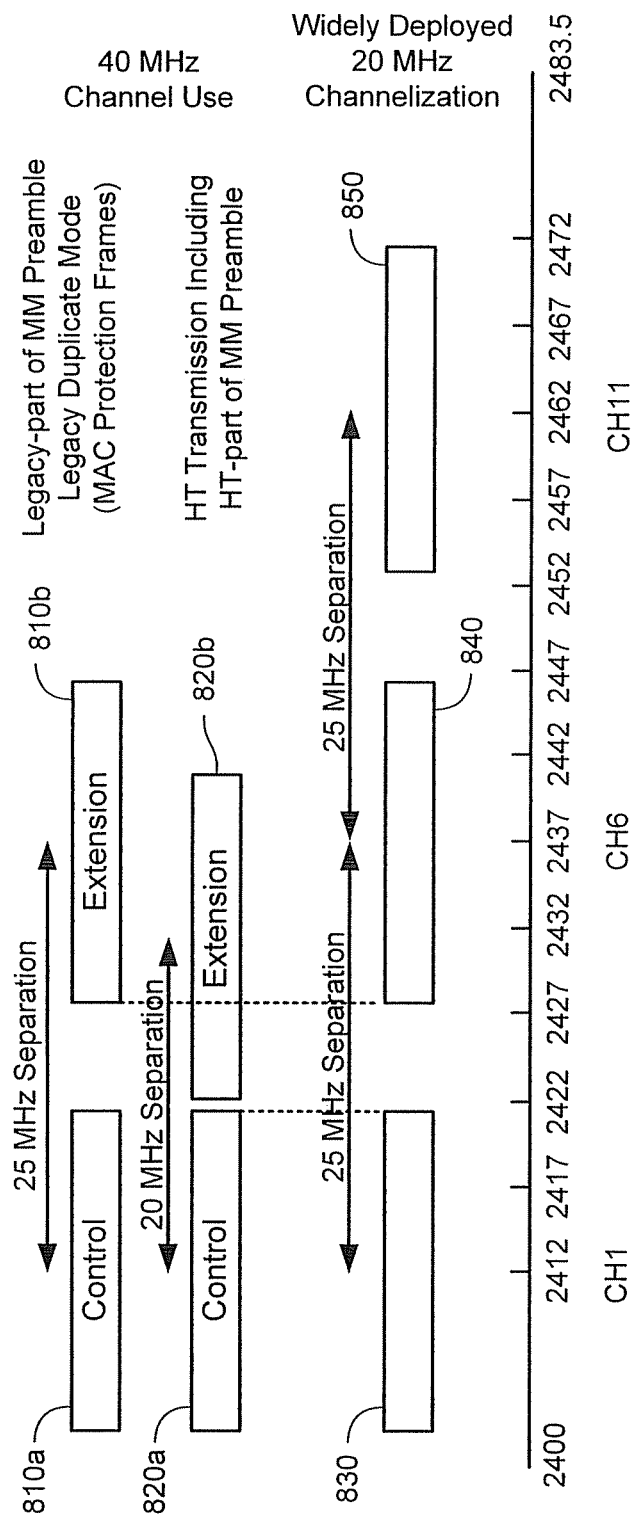
FIG. 8 is a diagram illustrating channel utilization according to an embodiment.

FIG. 8 is a diagram illustrating the bandwidth utilization in the 2.4 GHz band by a high-throughput device operating in conjunction with legacy devices. The HT device operates with programmable frequency separation to enable it to interoperate with legacy devices in the 2.4 GHz band. Legacy devices are operating in three 20 MHz wide channels CH1 (centered at 2412 MHz) 830, CH6 (centered at 2437 MHz) 840, and CH11 (centered at 2462 MHz) 850. HT devices are operating in two 20 MHz wide channels centered at 2422 MHz: control channel 820a and extension channel 820b. Because control channel 820a is centered on CH1 830, the HT devices can interoperate with legacy devices using, for example, 802.11b/g that are using CH1. However, because extension channel 820b is centered on CH5 and the legacy devices are using CH6, the HT devices using CH5 are not able to communicate with the legacy devices using CH6, and due to channel overlap, HT device transmissions on CH5 and legacy device transmissions on CH6 are likely to interfere with one another.

According to Option 1, a 40 MHz data frame comprises: a legacy 802.11 g preamble, an HT preamble, and HT data. The HT device first transmits the legacy 802.11g preamble comprising two duplicate legacy preambles: legacy preamble 810a is transmitted on the 20 MHz control channel, and legacy preamble 810b is transmitted on the 20 MHz control channel. The legacy preamble is shifted +5 MHz, such that the extension channel is centered at CH6 (2437 MHz) when transmitting the legacy preamble 810b on the extension channel. Thus, the extension channel of the HT device is aligned with the CH6 (840) being used by the legacy devices. As a result, the legacy devices will be able to receive and process the legacy preambles 810a and 820b transmitted by the HT device on CH1 and CH6 respectively. As a result, the HT device can signal the legacy devices to defer for a specified amount of time in order to allow the HT device to transmit on the control and extensions channels.

After transmitting the duplicate legacy preambles, the HT device transmits an HT preamble on control channel 820a and/or extension channel 820b. After transmitting, the HT preamble, the HT device transmits the data content on the control channel 820a and extension channel 820b. The HT preamble and the HT data are transmitted without the 5 MHz offset used for compatibility with the legacy devices. Extension channel 820b is centered on CH5 (2432 MHz) when transmitting the HT data.

The use of a legacy preamble as described in Option 1 advantageously enables the legacy devices to save power. By transmitting a legacy preamble to the legacy devices first, the HT device is able to notify the legacy devices that the data that is about to be transmitted across the two HT channels is not intended for the legacy devices. The legacy system can then defer from transmitting and/or receiving during the HT transmission. The legacy header might, for example, include a transmission length indicator that provides an estimated duration for the HT transmission. The legacy devices might then place their receivers in a low power state for the duration of the HT transmission specified in the legacy preamble. Some, if not all, of the legacy devices may be power sensitive devices, such as laptop computers, PDAs, mobile phones, and/or other portable devices that are powered by batteries. In power-sensitive devices such as these, powering down the receiver and/or placing the receiver in a low power state might provide significant power savings that might result in longer battery life. Of course, where power consumption is not a concern, the legacy devices might not power down anything for the duration of the HT transmission, but the legacy devices will defer use of the channel until the HT transmission is complete.

According to another embodiment (referred to herein as Option 2), the HT device uses a programmable frequency separation to enable the device to interoperate with legacy devices. Option 2 differs from Option 1 in that the HT device uses the programmable frequency separator for all modes: legacy duplicate mode and HT mode (both HT preamble and HT data transmissions).

Option 2 can be seen to be a method where the same signal is sent in each 20 MHz band (legacy duplication mode), but with a variable number of DC tones. For example, the number of DC tones would change from 3 to 19 in going from a 20 MHz separation to a 25 MHz separation.

As an example of one implementation, the transmitter can use, for instance, two 128-point IFFTs (inverse fast-Fourier transform) to generate positive and negative subcarriers separately at a sampling rate of 40 MHz. The 5 MHz gap makes it possible to separate positive and negative subcarriers at the receiver using two FIRs (finite input response filter), so the receiver can use two 64-point FFTs (fast-Fourier transform) on positive and negative subcarriers separately. This limits receiver complexity. Other methods are also possible. For example, a receiver may compute one 256-point FFT across 80 MHz and simply select the appropriate ones to capture the two separate 64-point OFDM signals.

In the case of a 20 MHz separation, the three DC tones are not enough separation to process the positive and negative subcarriers separately using the FIR approach, so preferably different processing required. For the 5 GHz band where the 20 MHz separation is retained, the receiver structure under Option 2 might look like the receiver structure for Option 1, as shown by example in FIG. 3, which would include a 40 MHz FIR.

An HT receiver should autodetect during long training of the 802.11n GreenField (GF) preamble whether the signal has mixed-mode (MM) or GreenField (GF) preamble. The GF preamble should be used where only HT devices are present, while the MM preamble should be used when legacy devices are present. In some embodiments, it might be preferred, where a GreenField is present, to change the HT-LTS pattern to get more reliable GreenField detection on HT-LTS1. For example, adding a pattern of {+1, -1} to each tone, which comprises the HT-LTS1 for the GF preamble so that it is easily distinguished from the HT-LTS1 of the MM preamble. Preferably, the STS (short training symbol) should include 25 MHz spacing in order to use the same method for detection and AGC for all modes.

Figure 9:
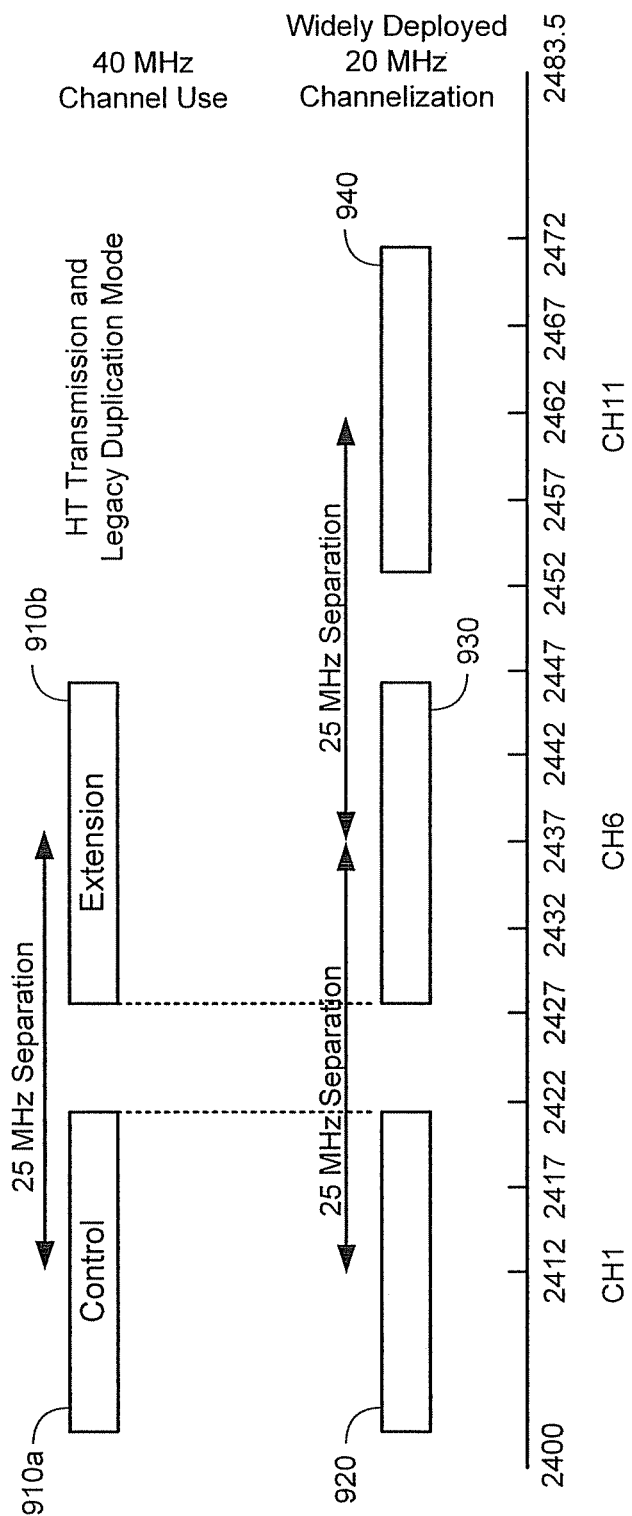
FIG. 9 is a diagram illustrating channel utilization according to another embodiment.

FIG. 9 illustrates the bandwidth utilization in the 2.4 GHz band for a mixed-mode system comprising legacy devices and HT devices, where the HT devices use a programmable frequency separation for both legacy duplicate mode and HT mode according to Option 2 described above. Like the embodiment described in FIG. 8, the HT device operates with a programmable frequency separation to enable it to interoperate with legacy devices in the 2.4 GHz band. FIG. 9 depicts legacy devices operating in three 20 MHz wide channels CH1 (centered at 2412 MHz) 920, CH6 (centered at 2437 MHz) 930, and CH11 (centered at 2462 MHz) 940. HT devices are operating in two 20 MHz wide channels: control channel 910*a* (centered at CH1) and extension channel 820*b* (centered at CH6).

In the embodiment depicted in FIG. 9, a 5 MHz separation is included between control channel 910*a* and extension channel 910*b* to provide a 25 MHz channel separation, so that control channel 910*a* is centered with legacy channel CH1 at 2412 MHz and extension channel 930 is centered with legacy channel CH3 at 2437 MHz.

An advantage provided by Option 2 is that the entire 40 MHz HT packet, including any legacy preamble information, HT preamble information, and HT data, is transmitted using the same frequency separation (e.g., 25 MHz). As a result, 40 MHz 802.11n GreenField (GF) packets can be transmitted in the same fashion, since the entire preamble and data are spaced by the same amount. In the 25 MHz-separation case depicted in FIG. 9, the 40 MHz HT packet might be constructed to occupy a total of 45 MHz of spectrum with a 5 MHz empty band between the two 20 MHz portions of the signal.

According to yet another embodiment (referred to herein as Option 3), the HT device uses a programmable frequency separation to enable the device to interoperate with legacy devices. However, Option 3 differs from Options 1 and 2 in that HT device uses the programmable frequency separator while transmitting legacy control frames. Control frames assist in coordinating data between stations in a wireless network. No changes are required for the 40 MHz HT packet transmission structure according to this approach. Instead, a control frame that duplicates 20 MHz legacy control frames is transmitted on carrier frequencies that have a programmable separation greater than 20 MHz. In this mode, the legacy frame is duplicated and then transmitted on two different carrier frequencies using legacy duplicate mode. In legacy duplicate mode, legacy transmissions comprising the same signal are sent on both HT channels (one of which is offset by the programmable frequency separator so that its frequency coincides with the frequency of a legacy channel).

IEEE 802.11, for example, includes several types of control frames: request to send (RTS) frames, clear to send (CTS) frames, and acknowledgement (ACK) frames. RTS frames are used in conjunction with RTS frames to reduce frame collisions where multiple stations are associated with an access point. A requesting station sends an RTS frame to another station as the first step before sending a data frame. A sending station sends a CTS frame in response to an RTS frame. The CTS frame indicates that the sending station is clear to transmit the data frame. The CTS might include a time value that causes all other stations to hold off transmitting for the period of time specified in the CTS. As a result, the number of collisions between stations might be minimized and throughput might be increased. Once the receiving station has received the data frame, the receiving station sends an ACK frame to the sending station indicating that the data was received with no errors. If the sending station does not receive an ACK frame within a predetermined amount of time, the sending station will retransmit the data frame.

Figure 10:
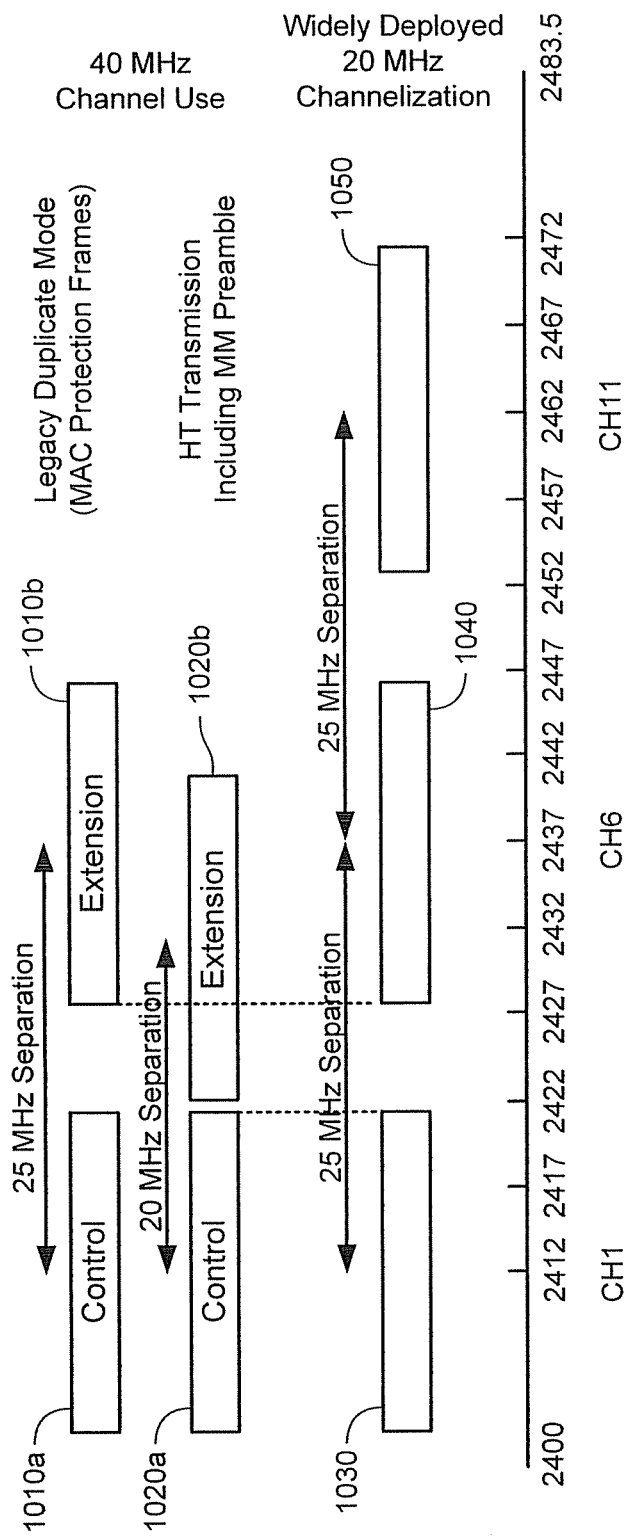
FIG. 10 is a diagram illustrating channel utilization according to yet another embodiment.

FIG. 10 illustrates the bandwidth utilization in the 2.4 GHz band for a mixed-mode system comprising legacy devices and HT devices, where the HT devices use legacy control frames according to Option 3 described above. Legacy devices operate in three 20 MHz wide channels spaced 25 MHz apart: CH1 (centered at 2412 MHz) 1030, CH6 (centered at 2437 MHz) 1040, and CH11 (centered at 2462 MHz) 1050. HT data and preambles are transmitted on control channel 1020*a* and/or extension channel 1020*b*. The centers are control channel 1020*a* and extension channel 1020*b* are spaced 20 MHz apart, with control channel 1020*a* centered at CH1 (2412 MHz) and extension channel 1020*b* centered at CH5 (2432 MHz).

Prior to the HT device transmitting a data frame on the two HT channels, a control frame is transmitted in "legacy duplicate mode." In legacy duplicate mode, the legacy control frame is duplicated and transmitted on two different carrier frequencies. The two carrier frequencies correspond to frequencies used by legacy devices. For example, in FIG. 10, the legacy control frame will be duplicated and transmitted both on control channel 1010a, which corresponds to CH1, and extension channel 1010b, which corresponds to CH6 in the 2.4 GHz band. In this example, the programmable separation is set to 5 MHz to shift the extension channel from being centered on CH5 (1020b) to being centered on CH6 which is used for communication by the legacy devices. As a result, the legacy devices should be able to receive and process the legacy control frame transmitted by the HT device on offset extension channel 1010b. If the HT device transmitted the legacy control frame on non-offset extension channel 1020b, the legacy devices listening on CH6 would not be likely to receive and process the control frame due to the offset channel offset between the transmitter and the receiver.

The control frame might comprise, for example, a CTS control frame. As described above, the CTS control fame might include a time value that indicates how long the legacy devices should hold off transmitting in order allow the sending device to transmit a data frame. The legacy devices, therefore, hold off transmitting for the time value. The legacy devices will then hold off from transmitting across CH1 and CH6 for the period of time specified in the CTS control frame. Accordingly, the HT device can alert legacy devices that the HT device is going to transmit. Therefore, the legacy devices might, in some instances, enter a low-power state for the duration of the HT transmission in order to conserve power. Also, the legacy devices will hold off from transmitting for the duration of the time period defined in the CTS control frame, which might help prevent collisions and help increase throughput.

After transmitting the legacy control frames, the HT device then transmits an HT header on control channel 1020a and/or extension channel 1020b using the HT channels with 20 MHz separation used by HT devices. The HT device then transmits a data frame across control channel 1020a and extension channel 1020b. Thus, the embodiment describe in FIG. 8 and Option 3 provide an HT device configured notify legacy devices before transmitting by transmitting legacy control frame using an offset channel configuration, while transmitting HT data using typical 40 MHz HT packet transmission with a 20 MHz channel separation.

With an HT device that can send legacy control frames, the HT device can alert legacy networks as appropriate and communicate intended usage of both bands while transmitting HT data using a 20 MHz channel separation while transmitting HT data (no programmable channel separation required for transmitting data).

Figure 2:
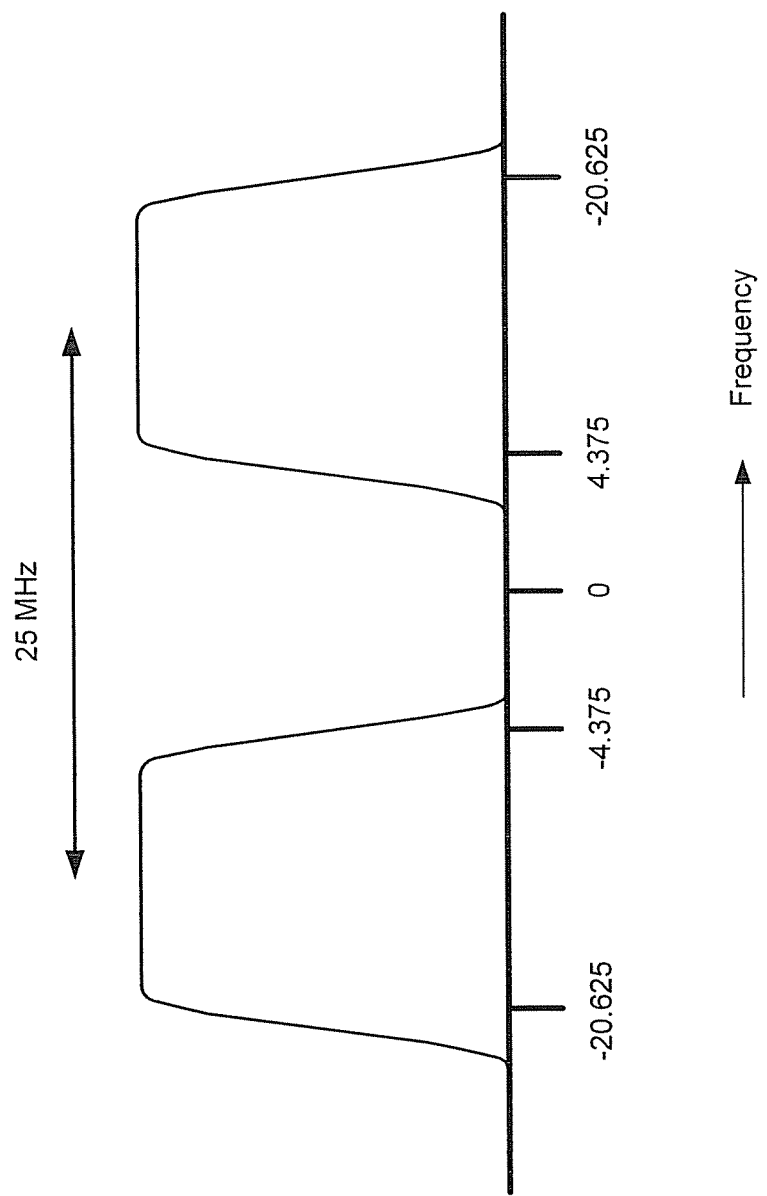
FIG. 2 is a plot illustrating a 25 MHz channel separation according to an embodiment.

FIG. 2 illustrates an example of a 25 MHz separation such as might be used for Options 1 and 3 described above. This 25 MHz separation could be used for the legacy part of an 802.11n 40 MHz mixed-mode preamble in 2.4 GHz. The same spectrum format could also be used for legacy duplicate mode in 2.4 GHz.

Figure 3:
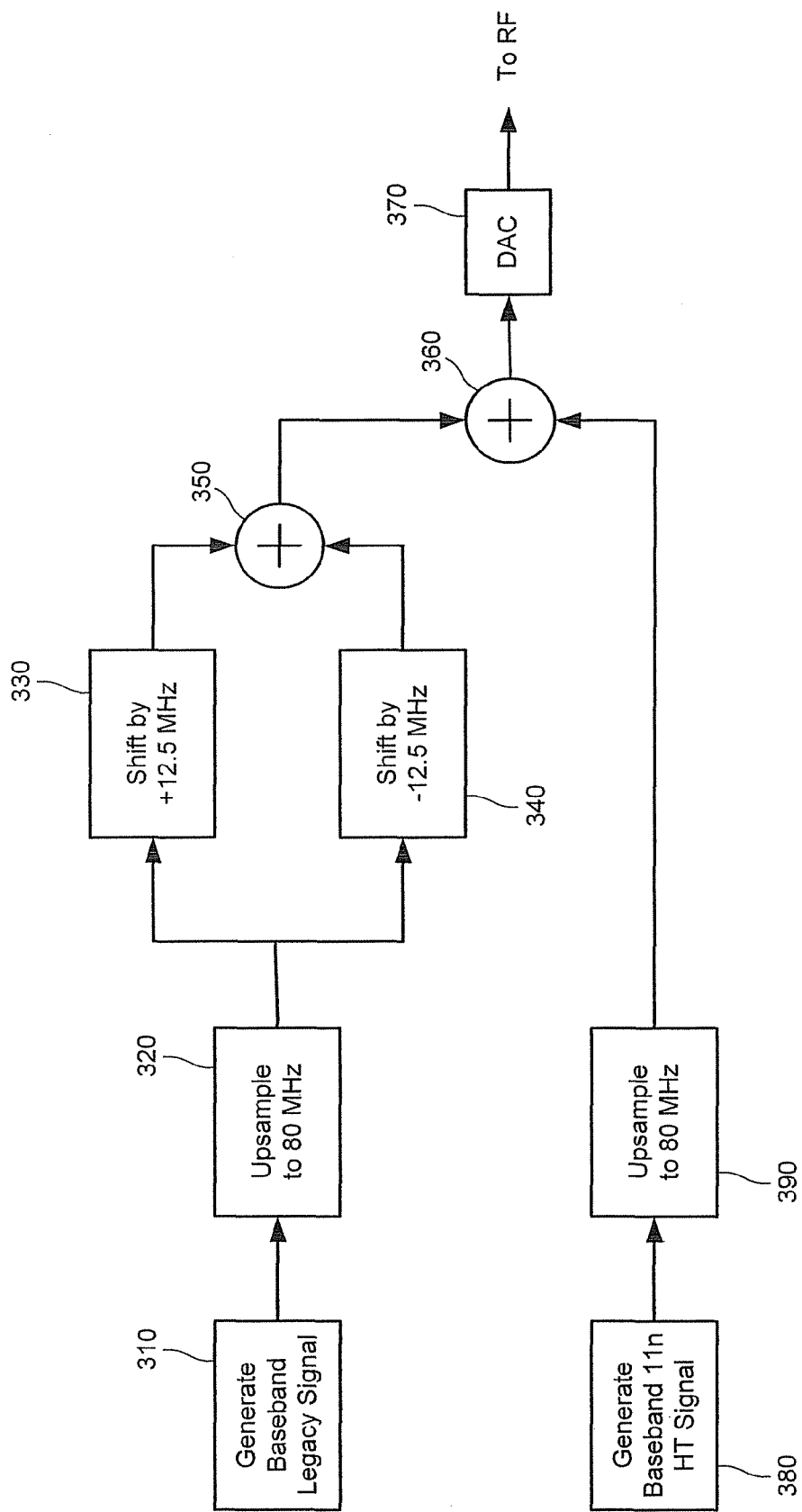
FIG. 3 is a block diagram illustrating a transmitter according to an embodiment.

FIG. 3 is a block diagram illustrating an exemplary transmitter (TX) according to some embodiments. For example, the TX illustrated in FIG. 3 might be used with the 2.4 GHz band HT devices described above for Option 1, illustrated in FIG. 8, and/or Option 3, illustrated in FIG. 10.

As shown, the baseband legacy signal (either a preamble or a full packet) can be generated (block 310), upsampled to 80 MHz (block 320), and then shifted by +/−12.5 MHz to give a 25 MHz separation (blocks 330 and 340), thus facilitating, for example, duplicate legacy messaging. Alternatively, a different set of frequency shift values may be chosen, for example +10 MHz and −15 MHz. This might allow for signaling to two networks of legacy devices to have them defer, without requiring serial transmissions of deferral packets to clear the channels one at a time.

The shifted legacy signals are then mixed by mixer 350 before being mixed with baseband HT signals by mixer 360. The mixed legacy and HT signals are input into digital-to-analog converter 370 and the resulting analog signal is broadcast by the transmitter.

HT signals are generated at block 380 and upsampled to 80 MHz at block 390. The upsampled signal is input into mixer 360 as described above.

Figure 4:
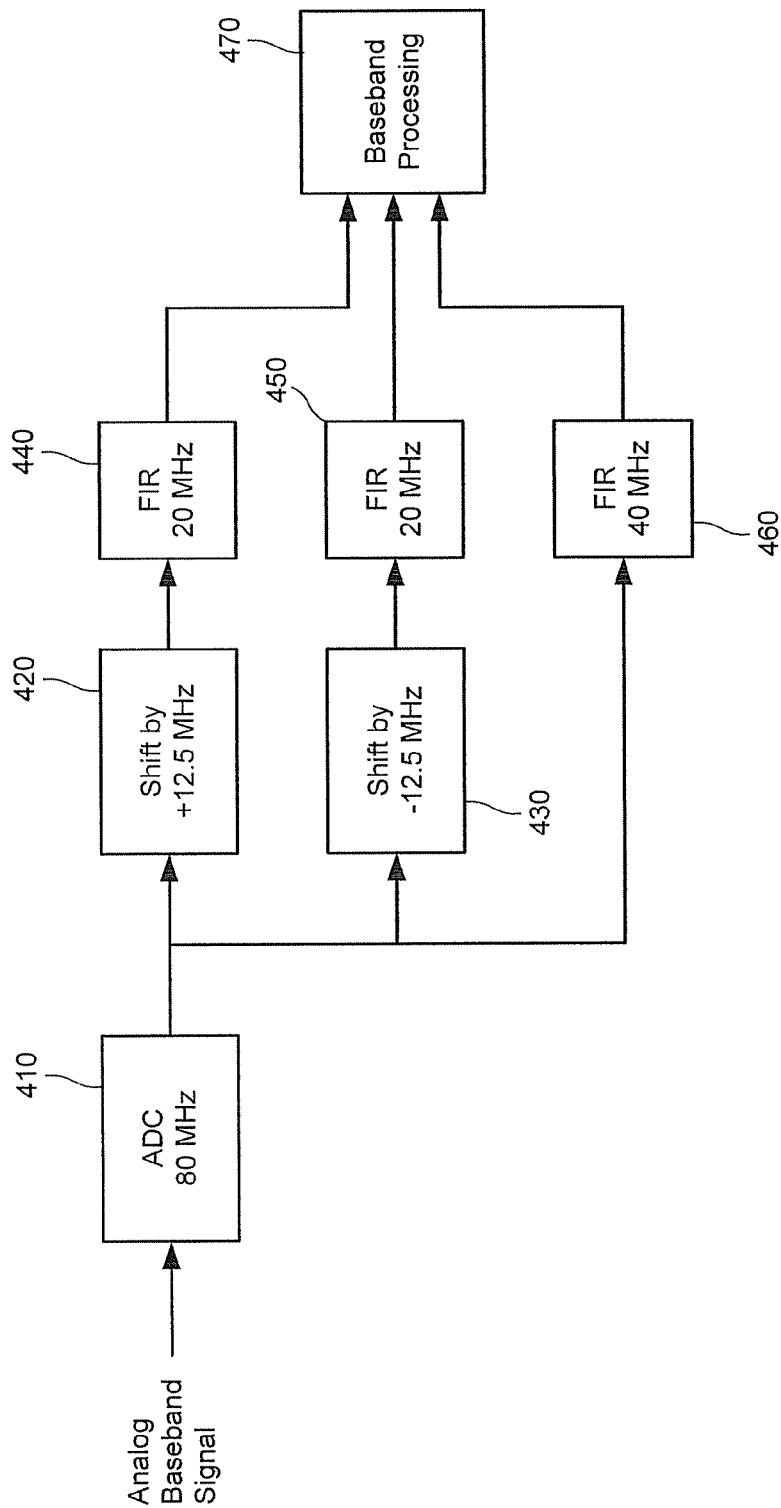
FIG. 4 is a block diagram illustrating a receiver according to an embodiment.

FIG. 4 is a block diagram illustrating an exemplary receiver (RX) according to some embodiments. The receiver illustrated in FIG. 4 might, for example, be used with the 2.4 GHz band HT devices described above for Option 1, illustrated in FIG. 8, and/or Option 3, illustrated in FIG. 10. The RX receives an analog baseband signal as an input. The analog baseband signal is converted into a digital signal by analog-to-digital converter (ADC) 410. The digital signal output by ADC 410 is fed directly into 40 MHz FIR (finite input response filter) 460 to filter out HT signals. The HT signals are then provided as an input for baseband processing 470.

The legacy part of the digital signal is detected and filtered out by two separate 20 MHz filters. The 40 MHz filter used for detecting and filtering out the HT part of the digital signal would not be effective for processing the legacy part of the signal because the legacy data is slightly larger than 40 MHz because the channel centers of the legacy data have a 25 MHz separation. The digital signal output by ADC 410 is shifted by +12.5 MHz 420 before being passed to 20 MHz FIR 440. The digital signal output by ADC 410 is also shifted by −12.5 MHz 430 before being passed to 20 MHz FIR 450. FIR 440 and FIR 450 filter out the legacy signals which are provided as inputs for baseband processing 470. As described above with the transmitter illustrated in FIG. 2, in some embodiments, a different set of frequency shift values may be chosen, for example +10 MHz and −15 MHz to provide a 25 MHz channel separation. Furthermore, a channel separation other than 25 MHz may also be used in some embodiments. However, both the transmitter and the receive must be configured to use identical frequency shift parameters in order for the transmitter to be able to properly recover the transmitted signals.

Figure 5:
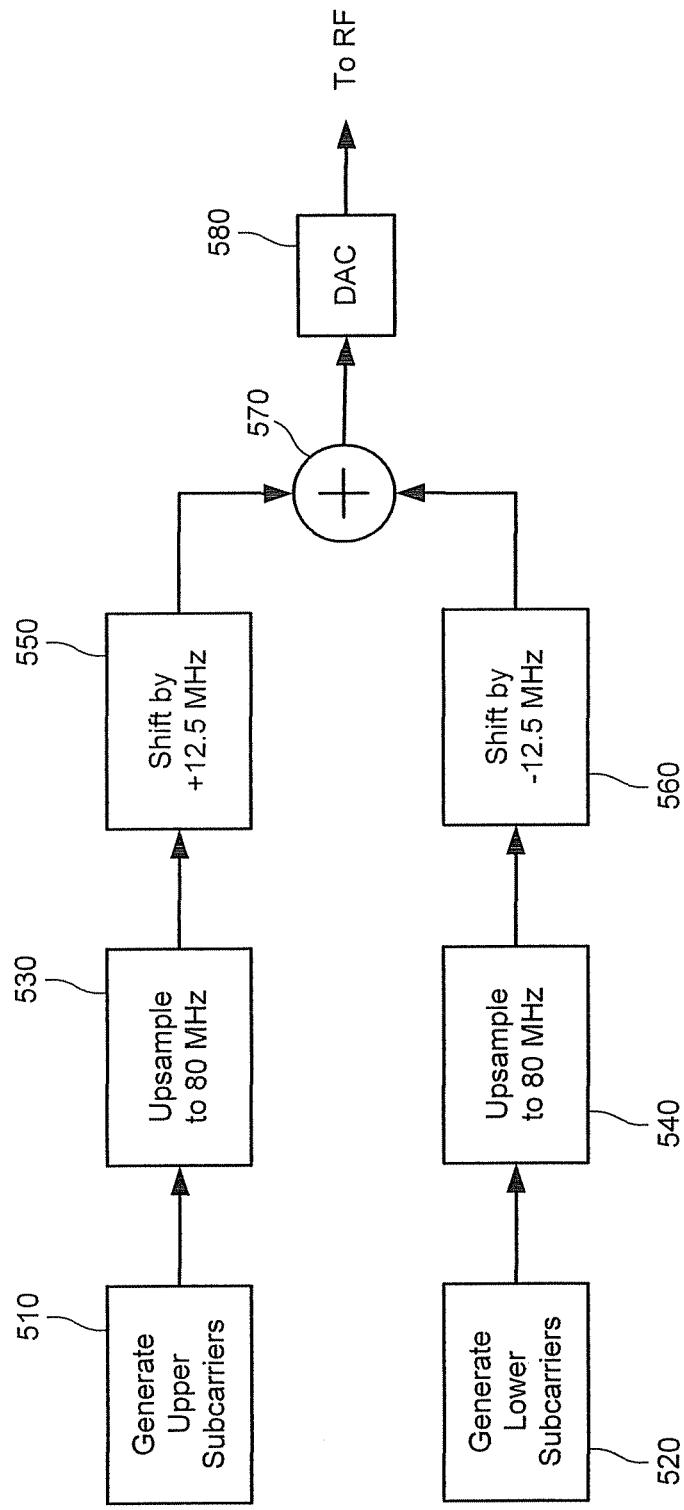
FIG. 5 is a block diagram illustrating a transmitter according to an embodiment.

FIG. 5 is a block diagram of an exemplary transmitter according to some embodiments. The TX illustrated in FIG. 5 might, for example, be used with the HT device operating using 802.11n in 2.4 GHz band such as is described in Option 2 above. The TX generates upper subcarriers (block 510) which are upsampled to 80 MHz (block 530) and shifted by +12.5 MHz (block 550). The TX also generates lower subcarriers (block 520) which are upsampled to 80 MHz (block 540) and shifted by −12.5 MHz (block 560). The shifted signals are mixed by mixer 570 and provided as an input to digital-to-analog converter (DAC) 580. DAC 580 converts the digital signal to an analog signal for broadcast across the wireless network. In this embodiment, HT data is transmitted is transmitted across the same 20 MHz channels as legacy data. Therefore, the HT data is transmitted using the same 25 MHz separation as is used by the legacy devices. As described above, in some embodiments, a different set of frequency shift values may be chosen, for example +10 MHz and −15 MHz to provide a 25 MHz channel separation. Furthermore, a channel separation other than 25 MHz may also be used in some embodiments. As indicated above, both the transmitter and the receive must be configured to use identical frequency shift parameters in order for the transmitter to be able to properly recover the transmitted signals.

Figure 6:
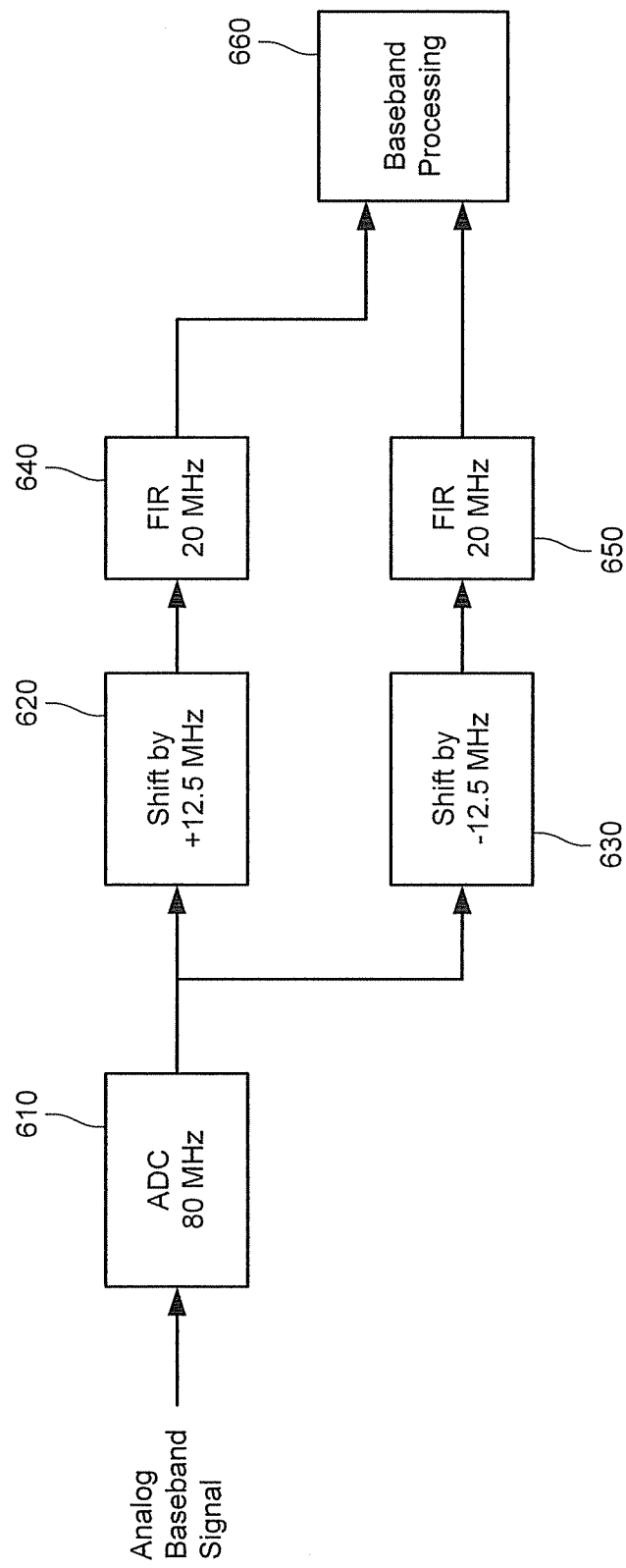
FIG. 6 is a block diagram illustrating a receiver according to an embodiment.

FIG. 6 is a block diagram of an exemplary receiver according to some embodiments. The RX illustrated in FIG. 6 might be used in conjunction with the TX described in FIG. 5. The RX receives an analog baseband signal as an input. The analog baseband signal is converted into a digital signal by analog-to-digital converter (ADC) 610. The HT and/or legacy signals included in the digital signal output by ADC 610 are detected and filtered out by two 20 MHz filters. The digital signal output by ADC 610 is shifted by +12.5 MHz (block 620) before being passed to 20 MHz FIR 640. The digital signal output by ADC 610 is also shifted by −12.5 MHz (block 630) before being passed to 20 MHz FIR 650. FIR 640 and 650 filter out the HT and/or legacy signals on the two 20 MHz channels and the resulting signals are provided as inputs for baseband processing 660.

As described above, in some embodiments, a different set of frequency shift values may be chosen, for example +10 MHz and −15 MHz to provide a 25 MHz channel separation. Furthermore, a channel separation other than 25 MHz may also be used in some embodiments. Furthermore, a channel separation other than 25 MHz may also be used in some embodiments. However, both the transmitter and the receive must be configured to use identical frequency shift parameters in order for the transmitter to be able to properly recover the transmitted signals.

While the invention has been described with respect to exemplary embodiments, one skilled in the art will recognize that numerous modifications are possible. For example, the processes described herein may be implemented using hardware components, software components, and/or any combination thereof. Thus, although the invention has been described with respect to exemplary embodiments, it will be appreciated that the invention is intended to cover all modifications and equivalents within the scope of the following claims.

What is claimed is:

1. A method for signaling on a mixed-mode wireless network comprising:
a plurality of channels, the mixed-mode wireless network usable by high-throughput wireless devices and legacy wireless devices, wherein the high-throughput wireless devices and the legacy wireless devices use channels of the same width, wherein the high-throughput wireless devices use high-throughput channels separated by high-throughput channel distances, the legacy wireless devices use legacy channels separated by legacy channel distances, and the high-throughput wireless devices concurrently transmit on at least two high-throughput channels, the method comprising:
determining whether legacy devices are present on the mixed-mode wireless network;
in response to the determining that the legacy devices are present, transmitting a legacy-part of a mixed-mode preamble on the at least two high-throughput channels associated with a high-throughput device, wherein the legacy-part of the mixed-mode preamble comprises two duplicate legacy preambles, wherein a frequency of at least one of the at least two high-throughput channels is offset by a high-throughput channel separator that enforces a non-contiguity between the at least two high-throughput channels commensurate with the offset and wherein the frequency of the at least one of the at least two high-throughput channels, as offset by the high-throughput channel separator, begins and ends with a frequency of a single legacy channel; and
after transmitting a legacy-part of a mixed-mode preamble, transmitting a high-throughput-part of the mixed mode preamble on the at least one of the at least two high-throughput channels associated with the high-throughput device; and
in response to determining that the legacy devices are not present on the mixed-mode wireless network, performing the transmitting a high-throughput-part of the mixed mode preamble without performing the transmitting the legacy-part of the mixed-mode preamble; and
after transmitting the high-throughput part of the mixed mode preamble, transmitting high-throughput data on the at least two high-throughput channels associated with the high-throughput device.

2. The method of claim 1, wherein the transmitting the high-throughput-part of the mixed mode preamble and the transmitting the high-throughput data on the at least two high-throughput channels include offsetting the frequency of the at least one of the at least two high-throughput channels by the high-throughput channel separator wherein the frequency of the at least one of the at least two high-throughput channels, as offset by the high-throughput channel separator, coincides with the frequency of a legacy channel.

3. The method of claim 1, wherein the transmitting the legacy-part of the mixed mode preamble further comprises:
transmitting a control frame on the at least two high-throughput channels associated with the high-throughput device, wherein the frequency of at least one of the at least two high-throughput channels is offset by a high-throughput channel separator and the frequency of the at least two high-throughput channels, as offset by the high-throughput channel separator, coincides with the frequency of a legacy channel.

4. The method of claim 3, wherein the transmitting the control frame comprises transmitting a clear-to-send frame.

5. The method of claim 4, wherein the transmitting the clear-to-send frame comprises transmitting a duration indicating a period during which the legacy devices cease transmitting to allow a high-throughput device to complete transmission.

6. The method of claim 1, wherein the high throughput devices transmit on two 20 MHz channels and the legacy devices transmit on one 20 MHz channel.

7. The method of claim 1, wherein the high throughput devices are configured to operate using 802.11n and the legacy devices are configured to operate using at least one of 802.11b and 802.11g.

8. The method of claim 1, wherein a channel separation of the high-throughput channels is 20 MHz and a channel separation of the legacy channels is 25 MHz.

9. The method of claim 1, wherein the two duplicate legacy preambles comprise:
a first legacy preamble that is transmitted on a first high-throughput channel of the at least two high-throughput channels; and
a second legacy preamble that is transmitted on a second high-throughput channel of the at least two high-throughput channels, the second legacy preamble being a duplicate of the first legacy preamble.

10. The method of claim 1, wherein the high-throughput part of the mixed mode preamble and the high-throughput data are transmitted without the frequency of the at least one of the at least two high-throughput channels being offset by the high-throughput channel separator.

11. A high-throughput wireless transmitter comprising:
at least one antenna configured for transmitting high-throughput wireless signals and legacy wireless signals; wherein the high-throughput wireless signals are concurrently transmitted over at least two high-throughput channels having a first channel separation and the legacy wireless signals are transmitted over one of a set of legacy channels having a second channel separation being enforced by a high-throughput channel separator that aligns one of the at least two high-throughput channels with one of the set of legacy channels, and a frequency of the one of the at least two high-throughput channels, as offset by the high-throughput channel separator, begins and ends with a frequency of one legacy channel in one of the set of legacy channels;
a high-throughput signal generation module configured to generate high-throughput signals, wherein the high-throughput signals are generated for the at least two high-throughput channels;
a legacy signal generation module configured to generate legacy signals, wherein the legacy wireless signals are generated for the one of a set of legacy channels, and the legacy signals are processed and understood by legacy devices; and
a legacy signal duplication module, wherein the legacy signal duplication module is configured to duplicate a legacy signal, wherein the legacy signal is broadcast over the at least two high-throughput channels.

12. The high-throughput transmitter of claim 11, further comprising:
a memory configured to store the high-throughput channel separator.

13. The high-throughput transmitter of claim 11, wherein the legacy signal generation module is configured to generate a legacy portion of a mixed-mode preamble.

14. The high-throughput transmitter of claim 11, wherein the legacy signal generation module is configured to generate a control frame.

15. The high-throughput transmitter of claim 14, wherein the control frame comprises a clear-to-send control frame.

16. A high-throughput wireless transmitter, configured to transmit in a 40 MHz band by concurrently transmitting in a first sub-band and a second sub-band 20 MHz apart, the high-throughput wireless transmitter configured to:
shift one of the first sub-band or the second sub-band, wherein the first sub-band and the second sub-band have a 25 MHz channel separation for a period sufficient to transmit a deferment request to a legacy device, the 25 MHz channel separation is maintained for the period by a channel separator that aligns a beginning and an ending frequency of one of the first sub-band or the second sub-band with one of the non-interfering or non-contiguous channel, wherein the deferment request comprises a legacy preamble that is duplicated and transmitted on both the first sub-band and the second sub-band.

17. The high-throughput wireless transmitter of claim 16, further comprising instructions to:
transmit the deferment request on both the first sub-band and the second sub-band to instruct legacy devices to defer from using the first sub-band and the second sub-band for a duration specified in the deferment request; and
transmit a high-throughput transmission on the first sub-band and the second sub-band.

18. The high-throughput wireless transmitter of claim 16, wherein the deferment request comprises a control frame.

19. The high-throughput wireless transmitter of claim 17, wherein the deferment request comprises a clear-to-send control frame.

20. The high-throughput wireless transmitter of claim 16, wherein the deferment request comprises a legacy-part of a mixed-mode preamble.

21. A method, comprising:
receiving a wireless signal;
processing a mixed-mode preamble associated with the wireless signal, the mixed-mode preamble indicates a legacy signal or a GreenField preamble indicative of a high-throughput signal, wherein a mixed-mode preamble that indicates a legacy signal is received in duplicate on legacy channels;
processing legacy signals received on the legacy channels, wherein the legacy channels have a first channel separation; and
processing high-throughput signals received on high-throughput channels, wherein the high-throughput channels have a second channel separation, the first channel separation and the second channel separation are unequal, and the first channel separation provides a frequency gap between the legacy channels that corresponds with an offset that at least temporarily aligns a beginning and an ending frequency of the high-throughput channels with one of the legacy channels.

22. An apparatus, comprising:
means for receiving a wireless signal with a first channel separation or a second channel separation; and
means for processing a mixed-mode preamble associated with the wireless signal, wherein the mixed-mode preamble indicates whether the wireless signal is a legacy signal or a high-throughput wireless signal, wherein a mixed-mode preamble that indicates the wireless signal is a legacy signal is received in duplicate on legacy channels, and wherein the legacy wireless signal is received on the legacy channels associated with the first channel separation, the high-throughput wireless signal is received on high-throughput channels associated with the second channel separation, the first channel separation and the second channel separation are unequal, and the first channel separation introduces a frequency gap between the legacy channels that at least temporarily aligns a beginning and an ending frequency of one of the legacy channels with one of the high-throughput channels.

23. A high-throughput wireless receiver comprising:
at least one antenna configured to receive a high-throughput wireless signal;
a detection component configured to process a preamble included in the high-throughput wireless signal, wherein the preamble is a mixed-mode preamble that indicates a legacy signal or a GreenField preamble that indicates a high-throughput signal, wherein a mixed-mode preamble that indicates a legacy signal is received in duplicate on legacy channels;
a legacy signal processing module configured to process legacy signals received via the at least one antenna, wherein the legacy signals are received on the legacy channels having a first channel separation;
a high-throughput signal processing module configured to process high-throughput signals received via the at least one antenna, wherein the high-throughput signals are received on high-throughput channels having a second channel separation, the first channel separation is not equal to the second channel separation, and the first channel separation introduces a frequency gap between each of the legacy channels that corresponds with an offset that temporarily aligns a beginning and an ending frequency of the high-throughput channels with one of the legacy channels; and a baseband processing module configure to process the high-throughput signals and the legacy signals received via the at least one antenna.

* * * * *